(12) United States Patent
Bridge, Jr. et al.

(10) Patent No.: US 7,260,658 B2
(45) Date of Patent: Aug. 21, 2007

(54) VERIFYING INPUT/OUTPUT COMMAND DATA BY SEPARATELY SENDING DATA TO BE WRITTEN AND INFORMATION ABOUT CONTENTS OF THE DATA

(75) Inventors: William H. Bridge, Jr., Alameda, CA (US); James Williams, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 10/425,166

(22) Filed: Apr. 29, 2003

(65) Prior Publication Data

US 2003/0226063 A1    Dec. 4, 2003

Related U.S. Application Data

(60) Provisional application No. 60/385,094, filed on May 31, 2002.

(51) Int. Cl.
G06F 3/00 (2006.01)
(52) U.S. Cl. .............................. 710/55; 710/5; 708/102
(58) Field of Classification Search .................... 710/5, 710/55; 718/102, 115
See application file for complete search history.

(56) References Cited

U.S. PATENT DOCUMENTS

| | | | | |
|---|---|---|---|---|
| 5,113,502 A | * | 5/1992 | Merrill et al. ............... 718/102 |
| 5,289,478 A | * | 2/1994 | Barlow et al. ............... 714/770 |
| 5,392,209 A | * | 2/1995 | Eason et al. .................... 707/3 |
| 5,504,484 A | * | 4/1996 | Wilson ......................... 341/67 |
| 5,586,204 A | | 12/1996 | Noble et al. ................. 382/282 |
| 5,848,026 A | | 12/1998 | Ramamurthy et al. ... 365/238.5 |
| 5,873,043 A | * | 2/1999 | Comer ......................... 455/458 |
| 5,918,212 A | * | 6/1999 | Goodwin, III ............... 705/20 |
| 5,930,818 A | * | 7/1999 | Suu et al. .................... 711/115 |
| 5,933,434 A | | 8/1999 | Roohparvar ................ 371/21.1 |
| 6,014,723 A | | 1/2000 | Tremblay et al. ............... 711/1 |
| 6,266,202 B1 | | 7/2001 | Nguyen et al. ............... 360/53 |
| 6,553,514 B1 | | 4/2003 | Baumgartner et al. ........ 714/32 |
| 6,631,007 B1 | * | 10/2003 | Buis et al. .................. 358/1.13 |
| 6,651,198 B1 | | 11/2003 | Wang .......................... 714/726 |
| 6,671,847 B1 | | 12/2003 | Chao et al. ................. 714/744 |
| 7,024,593 B1 | * | 4/2006 | Budd et al. .................... 714/48 |

* cited by examiner

Primary Examiner—Donald Sparks
Assistant Examiner—Harold Kim
(74) Attorney, Agent, or Firm—Aka Chan LLP

(57) ABSTRACT

Techniques for verifying input/output (I/O) command data are provided. Information about the contents of the data are specified in the I/O command. After an application issues the I/O command, a subsequent component, such as a controller, uses the information to verify the contents of the data before the I/O command is performed.

30 Claims, 5 Drawing Sheets

VERIFYING INPUT/OUTPUT COMMAND DATA BY SEPARATELY SENDING DATA TO BE WRITTEN AND INFORMATION ABOUT CONTENTS OF THE DATA

This application claims priority to U.S. Provisional Application No. 60/385,094, filed May 31, 2002, which is hereby incorporated by reference for all purposes.

RELATED APPLICATIONS/PATENTS

The application is related to U.S. application Ser. No. 10/133,002, filed Apr. 25, 2002, pending and U.S. application Ser. No. 09/765,680, filed Jan. 18, 2001, pending.

BACKGROUND OF THE INVENTION

The present invention relates to computer systems. More specifically, the invention relates to verifying input/output command data.

Early on in the development of computer systems, it became apparent that it would be advantageous, if not necessary, to store data on persistent storage, such as hard drives. The benefits and advancements (e.g., increased storage capacity and speed) in persistent storage have been a significant reason that computer systems have become so successful over the years.

Occasionally, however, design faults or hardware failures result in the wrong data being transferred to the persistent storage. This can be the result of software failures in the memory manager of the operating system not providing the correct physical address the memory. Also, a failure in the host bus adapter can result in using the data intended for another input/output (I/O) command. Additionally, a switch on the storage area network (SAN) could misroute the data or command. There are many other possible failures that can result in the wrong data being stored on the storage device (e.g., disk drive). With current technology, this failure is not noticed until the data is read from the storage device. By then, however, it is too late to take any corrective action so the data is lost. Furthermore, the previous version of the data is also lost.

One solution is to reread the data after every write and verify that it is correct. In many systems, this will not detect a significant proportion of the failures because the reread will get the data from the nearest cached copy of the data rather than from the persistent storage. The failure can be in the transfer from the cached copy to the persistent storage, which would not be detected. If rereading does go all the way to the storage, then the cost of every write is doubled. This is why it is not common for applications to issue rereads after writes.

Another solution is to mandate that all the blocks that are stored on the persistent storage (or logical partition thereof) have a common format. For example, each block can be the same size and have a block number and checksum in known locations in the block. This way, the persistent storage can verify the block number and/or the checksum of a block before it is written. Although this solution can work well in some situations, it has some drawbacks. By mandating that all the blocks on the storage device have the same format, it maybe be difficult, if not impossible, to mix blocks from different applications on the same storage device. Also, it may require coordination of product updates to both the storage and the application to introduce a new block format.

It would be beneficial to have improved techniques for verifying I/O command data. Additionally, it would be beneficial to have innovative techniques for verifying that the data that is intended to be written to a storage device is the data that is actually going to be written.

SUMMARY OF THE INVENTION

The present invention provides innovative techniques for verifying I/O command data. In general, information about the contents of the data are specified in the I/O command, such as a disk drive write. After an application issues the I/O command, a subsequent component, such as a controller, uses the information to verify the contents of the data before the data is made persistent on a storage device. This has an advantage that the I/O command is typically a different operation than the operation that retrieves the data that is the subject of the I/O command. Thus, a separate operation is being utilized to verify the data that is the subject of the I/O command. Some specific embodiments of the invention are described below.

In one embodiment, the invention provides a method of performing a write command. A write command is issued specifying data to be written and information about contents of the data. The contents of the data are verified utilizing the information and the write command is committed if the contents of the data are verified. The information can be that the data has a specific property (e.g., XORs to zero or a specified number), that a number (e.g., a block number) is contained in the data and/or the like.

In another embodiment, the invention provides a method of performing a write command of data to a storage device, such as a disk drive. A write command of data to a storage device, including parameters specifying the data and information about contents of the data, is issued. The contents of the data are verified utilizing the information and the write command of the data to the storage device is performed if the contents of the data are verified. Additionally, data including multiple blocks can be verified by verifying block numbers in each of the blocks.

In one embodiment, the invention provides a method of performing a read command. A read command is issued specifying information about contents of the data. The read command is performed and contents of the data that are read are verified utilizing the information. If the data does not verify, the data can be read from a mirrored drive, for example.

Other features and advantages of the invention will become readily apparent upon review of the following description in association with the accompanying drawings, where the same or similar structures are designated with the same reference numerals.

DETAILED DESCRIPTION OF PREFERRED EMBODIMENTS

In the description that follows, the present invention will be described in reference to embodiments that verify I/O command data for applications, such as database applications. However, embodiments of the invention are not limited to any particular architecture, environment, application, or implementation. For example, although one embodiment will be described in reference to a database application, the invention may be advantageously applied to any computer program or application. Therefore, the description of the embodiments that follows is for purposes of illustration and not limitation.

Figure 1:
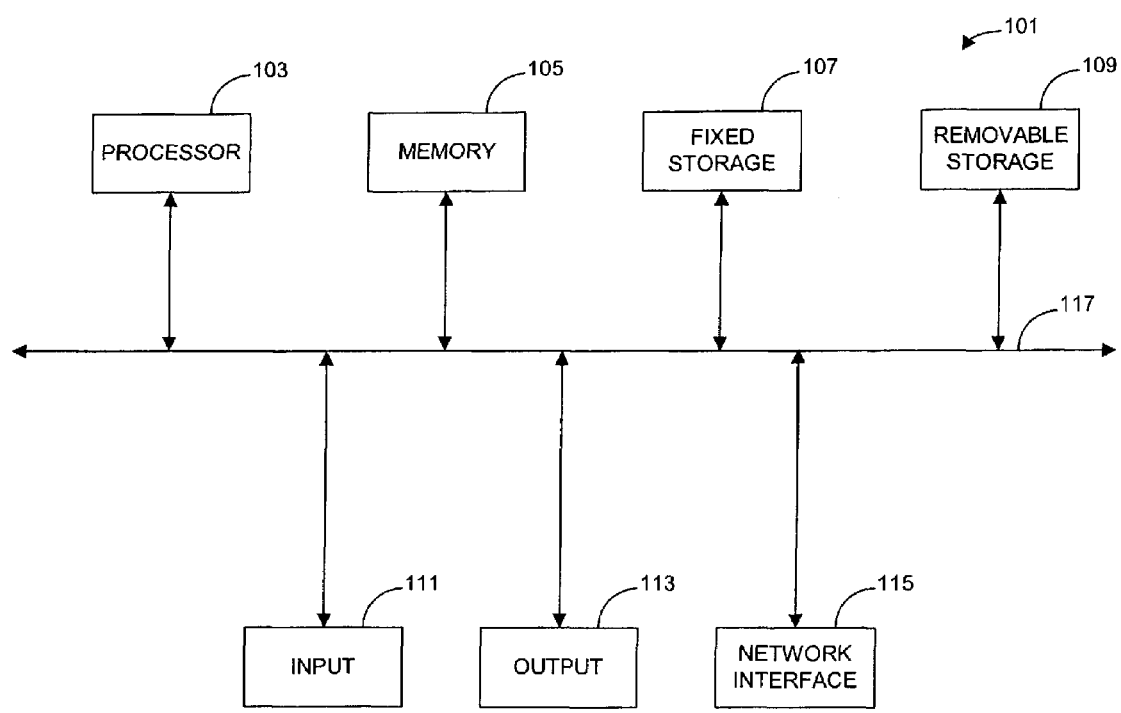
FIG. 1 illustrates a block diagram of a computer system that can be utilized in association with embodiments of the invention.

FIG. 1 shows a block diagram of components that can be present in computer systems that implement embodiments of the invention. A computer system 101 includes a processor 103 that executes instructions from computer programs (including operating systems). Although processors typically have memory caches also, processor 103 utilizes memory 105, which can store instructions or computer code and data.

A fixed storage 107 can store computer programs and data such that it is typically persistent and provides more storage when compared to memory 105. At present, a common fixed storage is one or more hard drives. A removable storage 109 provides mobility to computer programs and/or data that are stored thereon. Examples of removable storage are floppy disks, tape, CD/ROM, flash memory devices, and the like.

Memory 103, fixed storage 107 and removable storage 109 provide examples of computer readable storage media that can be utilized to store and retrieve computer programs incorporating computer codes that implement the invention, data for use with the invention, and the like. Additionally, a data signal embodied in a carrier wave (e.g., in a network including the Internet) can be the computer readable storage medium. An input 111 allows a user to interface with the system. Input can be done through the use of a keyboard, a mouse, buttons, dials, or any other input mechanism. An output 113 allows the system to provide output to the user. Output can be provided through a monitor, display screen, LEDs, printer or any other output mechanism.

A network interface 115 allows the system to interface with a network to which it is connected. The system bus architecture of computer system 101 is represented by arrows 117. The components shown in FIG. 1 can be found in many network devices and computer systems. However, components can be added, deleted and combined. For example, fixed storage could be an array of hard drives or the fixed storage could be a file server that is accessed through a network connection. Thus, FIG. 1 is for illustration purposes and not limitation.

FIG. 1 show hardware of a computer system, but many errors that occur during an I/O command are the result of an error (or bug) in software. Therefore, it maybe beneficial to discuss a representative system showing hardware and software components.

Figure 2:
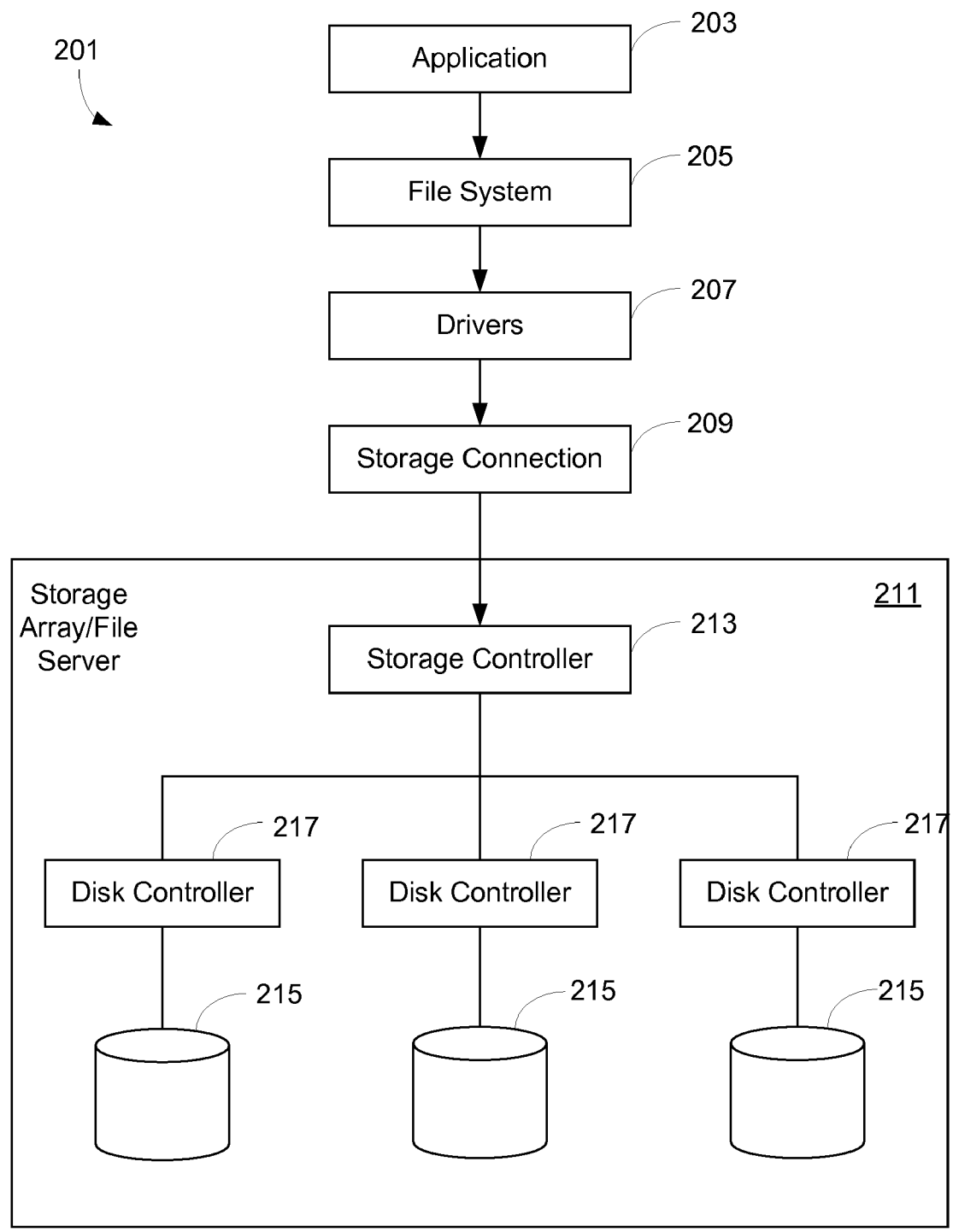
FIG. 2 shows a block diagram of a system in which an embodiment of the invention can be utilized.

FIG. 2 shows a block diagram of a system showing an application that stores data on one or more disk drives. A system 201 includes an application 203. For example, the application can be a database application that stores data on multiple disk drives. Although accuracy of data is important with most applications, the accuracy of the data is critical in database applications.

When application 203 desires to issue an I/O command to read or write data, the application communicates with file system 205. File system 205 can be part of the operating system that manages the storage of data generically at a high level. File system 205 communicates with drivers 207, which are usually specific to the hardware in the system.

A storage connection 209 is a connection to a storage array or file server 211. A storage controller 213 controls access to multiple storage devices (e.g., disk drives 217) where disk controller 217 controls access to a storage device. Many of the components shown in FIG. 1 can be hardware, software or a combination of the two.

When an I/O command is issued by application 203, errors can occur at many places between the application and storage devices 215. Any of these components can advantageously utilize an embodiment of the invention to verify I/O command data. Thus, an embodiment could reside in any of the components shown in FIG. 2 (and others that are not shown). Of course, the closer the component is to the performance of the I/O command, the more likely it is that errors will be detected.

As an example, assume that storage controller 213 includes the ability to verify I/O command data. Further assume that application 203 issues an I/O command that specifies information about the contents of the data such as follows: write (data_pointer, length, destination, . . . , XOR_flag);

As shown, the I/O command is a write command. The data to be written is specified by a pointer to the data "data_pointer." The parameter "length" specifies the length of the data and "destination" specifies the destination where the write is to occur (e.g., a pointer to a file or logical unit of storage). I/O commands can include these parameters, less than these parameters or more than these parameters depending on the environment.

The "XOR_flag" parameter specifies information about the contents of the data. In this example, the information specifies a specific property of the data, which is that the data XORs (e.g., 16 bit XOR) to zero. Typically, a value in the data is set in order to make the data XOR to zero. In one embodiment, an "XOR_value" parameter specifies the value that should result from an XOR of the data.

The I/O command and the data will often travel in separate operations (or message streams) to storage controller 213. For example, the I/O command can be sent initially and the data that is the subject of the command can be sent shortly thereafter. In this way, there is a reduced likelihood that both the I/O command and data would be corrupted in the same manner.

When storage controller 213 receives the I/O command, it can determine that the XOR_flag indicates that the data should XOR to zero. The array controller can then XOR the data and determine if this is true. If array controller verifies that the data matches the information in the I/O command about the contents of the data, the array controller can allow the I/O command to be performed. Otherwise, the array controller could return an error indication.

As will be discussed below, the information about the contents of the data can alternatively or additionally be a value (or number such as a block number) that is contained in the data. In other embodiments, the information about the contents of the data can be a number in a specific location in each block that is the same or constant. Thus, the invention is not limited to any specific information about the contents of the data.

Figure 3:
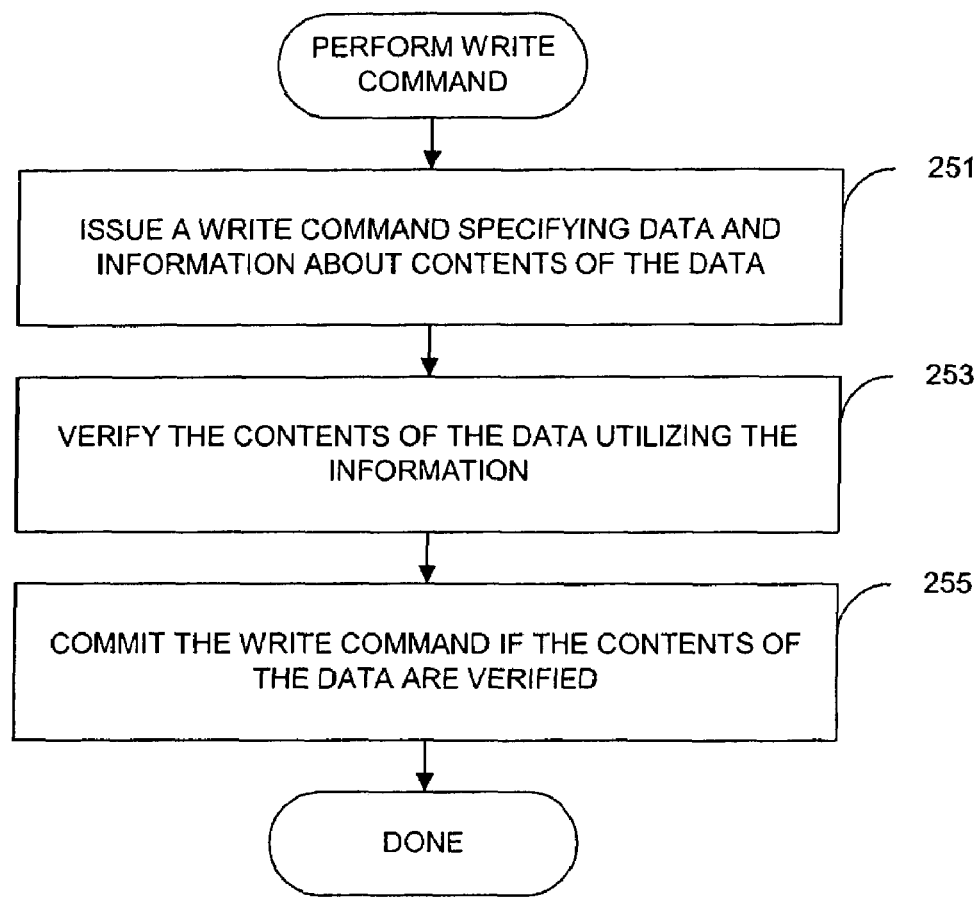
FIG. 3 shows a flowchart of a process of performing an I/O command where the data is verified from information in the I/O command.

Now that an example has been described, it may be beneficial to discuss an embodiment of a process of performing a write command. FIG. 3 shows a flowchart of a process of performing a write command where the data to be written is verified from information in the written command. As with all flowcharts herein, steps can be added, deleted, reordered, and combined without departing from the spirit and scope of the invention.

At a step 251, a write command is issued that specifies data to be written and information about the contents of the data. The information can be a property of the data, one or more values that are contained in the data, and/or the like.

The contents of the data are verified utilizing the information at a step 253. Typically, the contents of the data are verified by a component that is subsequent to the component (e.g., application) that issued the write command.

At a step 255, the write command is committed (e.g., made persistent) if the contents of the data are verified. If the contents of the data are not verified, an error indication can be returned. When the error indication is received, the write command may be reissued one or more times in an attempt to perform the write command where the data is verified.

In other embodiments, an error may be returned even if the data or some portion of the data is made persistent. Thus, the write command may be committed even though the data failed verification, but an error would be returned.

In embodiments that verify read commands, a read command can be issued specifying information about contents of the data. The read command is performed and contents of the data that are read are verified utilizing the information. If the data does not verify, the data can be read from another source, such as a mirrored drive.

Figure 4:
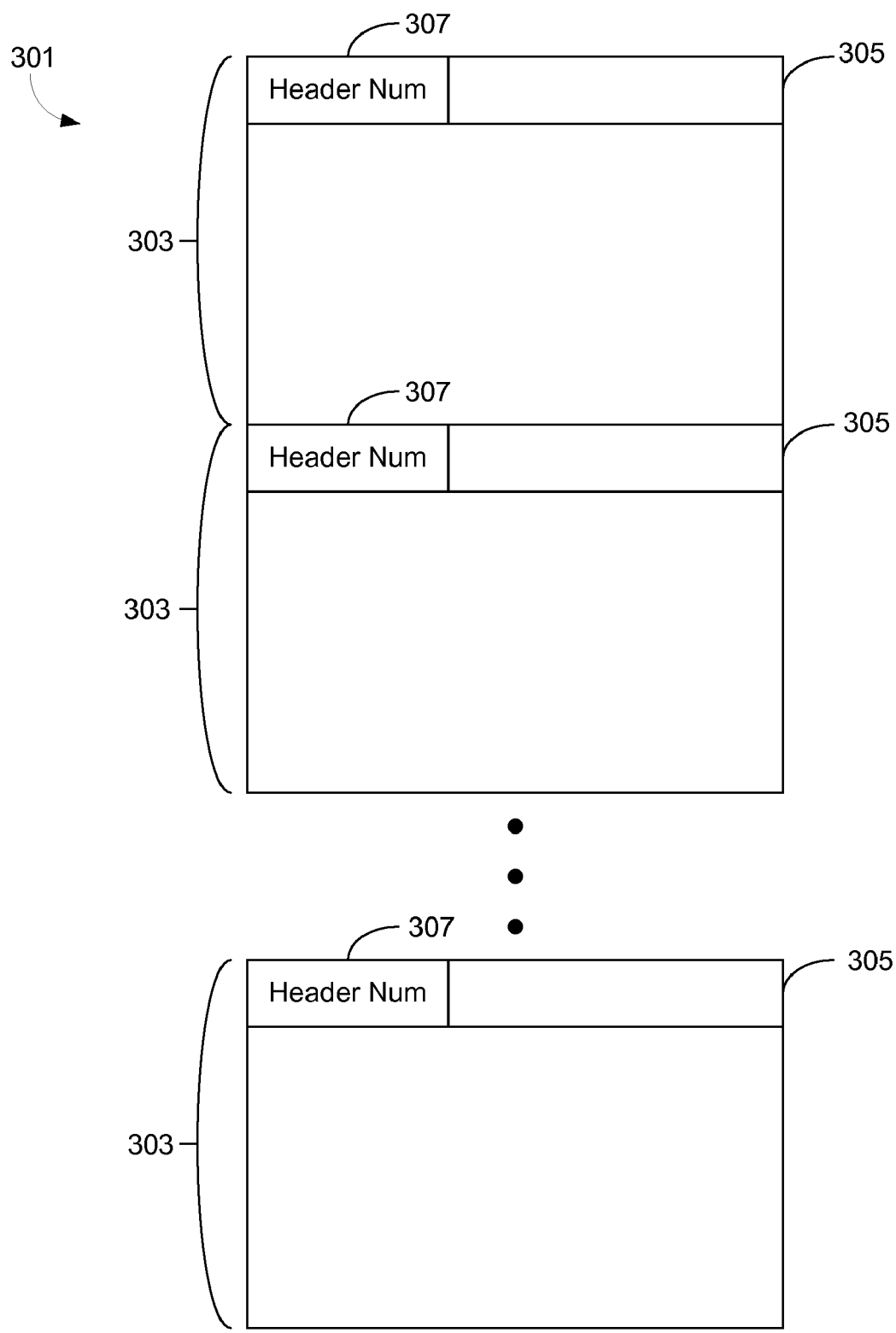
FIG. 4 shows data that can be the subject of an I/O command, where the data includes multiple blocks with a block number in the header.

With some I/O commands, the data includes multiple blocks. FIG. 4 shows multiple blocks that can be the subject of an I/O command. Data 301 includes multiple blocks 303. Each block 303 has the same format, including the length. A block 303 includes a header 305 that can store information concerning the block. For example, header 305 includes a block number 307 that specifies the number of the block. Blocks in data 301 will typically have block numbers that increase sequentially. Although block number 307 is shown as the first data being stored in each block 303, block numbers (or other information) can be stored in other locations in the blocks.

An example of an I/O command that writes the data shown in FIG. 4 and also specifies information about the contents of the data is as follows:

write (data_pointer, length, destination, . . . , content_flag, offset, content_data, repeat);

As before, the data to be written is specified by a pointer to the data "data_pointer." The parameter "length" specifies the length of the data and "destination" specifies the destination where the write is to occur. The parameter "content_flag" indicates that the last three parameters specify information about the contents of the data. In other words, if the content_flag is not set, verification of the data using these parameters will not occur.

The parameter "offset" specifies the offset within a block where a block number will be found. The parameter "content_data" specifies the number, in this case the block number, that will be found in the block. As the blocks shown are numbered sequentially, this will be the block number of the first block. Lastly, the parameter "repeat" specifies the length of a block so that sequential blocks can be located and verified using a sequentially higher block number.

Although these three parameters can be utilized, other embodiments can utilize fewer or more parameters. For example, if the offset of the block number within a block is assumed to be a specific offset (e.g., zero), this parameter could be omitted. Additionally, additional parameters can be utilized including having an additional XOR_flag that also indicates that the data has a specific property as described above.

Figure 5:
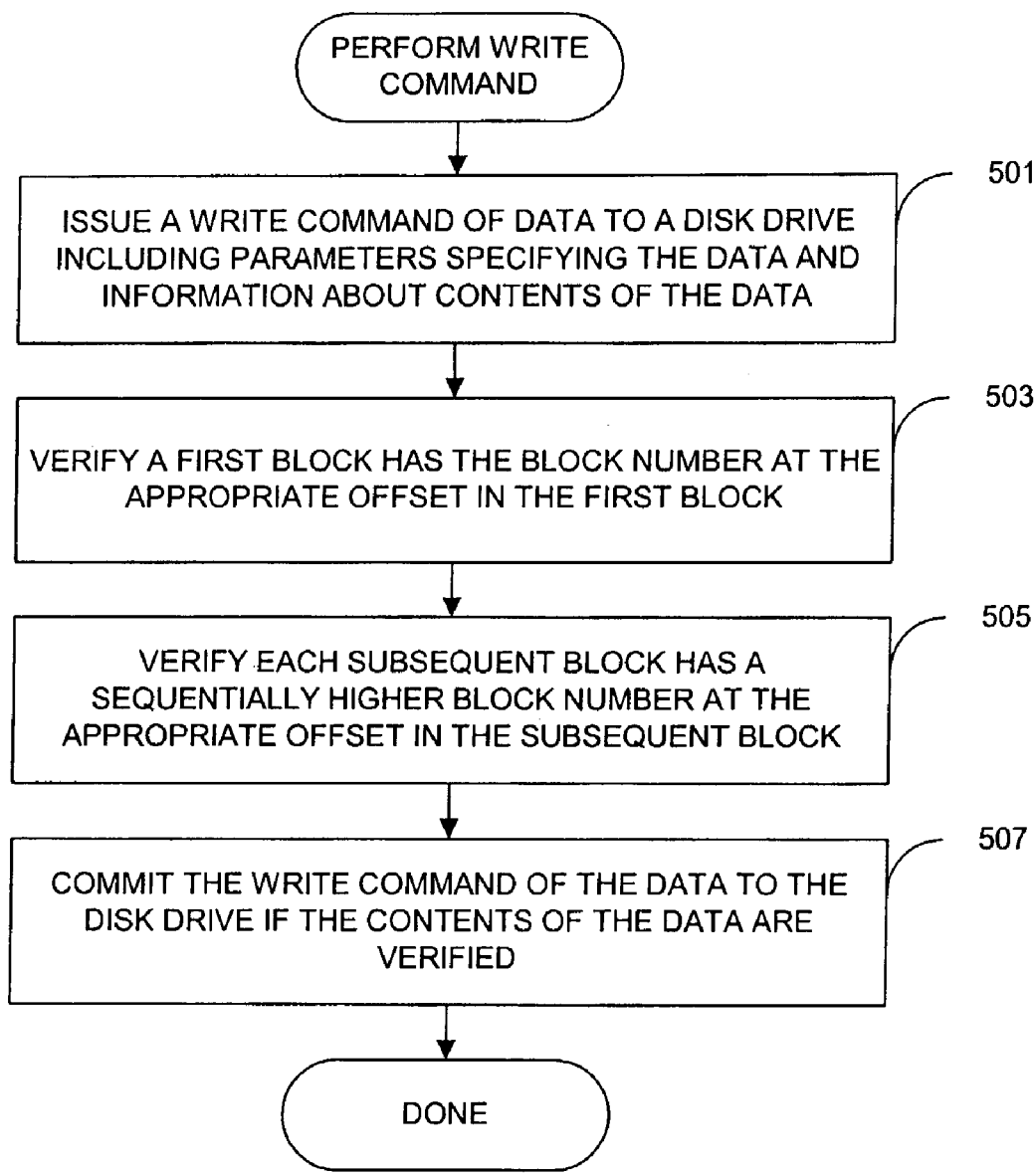
FIG. 5 shows a flowchart of a process of performing a write command to a disk drive where the data includes multiple blocks and the write command is verified from information in the write command.

FIG. 5 shows a flowchart of a process of performing a write command to a storage device where the data includes multiple blocks and the data to be written is verified from information in the write command. At a step 501, a write command of data to a storage device is issued. The write command includes parameters specifying the data and information about the contents of the data. The data here includes multiple blocks and, as shown above, the information can be a block number of an initial block.

A first block is verified that it has the block number at the appropriate offset in the first block at a step 503. The block number can be specified as a parameter in the write command. Additionally, the appropriate offset can be specified as a parameter in the write command or it can be a known value.

At a step 505, each subsequent block is verified that it has a sequentially higher block number at the appropriate offset in the subsequent block. If the length of the blocks is known or there is some other manner for determining block boundaries, the length of a block may not be needed. If the length of a block would be beneficial for locating subsequent blocks, the length can be specified as a parameter in the write command.

Each block can also be verified in one or more other ways. For example, an XOR operation can be performed on the data in the block to further verify that the data has not been corrupted. Parameters specifying the XOR operation can be included in the write command as discussed above. As another example, a checksum can be utilized to verify the data. The checksum value can be stored in the data block or specified as a parameter of the write command.

The write command of the data to the storage device is committed at a step 507 if the contents of the data are verified. In this manner, the write command data is verified before it is written so that if there are any errors, corruption can be avoided. Once erroneous data is written, it may be very difficult or impossible to recover correct data.

While the above is a complete description of preferred embodiments of the invention, various alternatives, modifications, and equivalents can be used. It should be evident that the invention is equally applicable by making appropriate modifications to the embodiments described above. For example, the examples have been discussed in reference to write commands, but the invention can be advantageously applied to other I/O commands, including read commands where a verification failure could be an indication to obtain the data from an alternative source. Therefore, the above description should not be taken as limiting the scope of the invention that is defined by the metes and bounds of the appended claims along with their full scope of equivalents.

What is claimed is:

1. A computer-implemented method of performing a write command, comprising:

invoking a write command specifying data to be written and information about contents of the data, wherein the data to be written is sent in a first stream and the information about contents of the data is sent in a second stream, separate from the first stream;

verifying the contents of the data utilizing the information; and committing the write command if the contents of the data are verified.

2. The method of claim 1, wherein the second stream is sent before the first stream.

3. The method of claim 1, wherein the information is that the data XORs to a specified value.

4. The method of claim 1, wherein the information specifies a number contained in the data.

5. The method of claim 4, wherein the number is a block number.

6. The method of claim 5, wherein the information further specifies a length of a block.

7. The method of claim 4, wherein the information further specifies an offset of the number in the data.

8. The method of claim 1, wherein the write command is a write of the data to a disk drive.

9. The method of claim 1, wherein the data and information are specified as parameters of the write command.

10. A computer program product that performs a write command, comprising:
   computer code that issues a write command specifying data to be written and information about contents of the data, wherein the data to be written is sent in a first stream and the information about contents of the data is sent in a second stream, separate from the first stream;
   computer code that verifies the contents of the data utilizing the information; and
   computer code that commits the write command if the contents of the data are verified; and
   a computer readable storage medium that stores the computer codes.

11. The computer program product of claim 10, wherein the computer readable storage medium is a CD-ROM, floppy disk, tape, flash memory, system memory, or hard drive.

12. A system, comprising:
   an application that issues a write command specifying data to be written and information about contents of the data, wherein the data to be written is sent in a first stream and the information about contents of the data is sent in a second stream, separate from the first stream;
   a controller that receives the write command and verifies the contents of the data utilizing the information; and
   a hard drive that commits the write command if the contents of the data are verified.

13. The system of claim 12, wherein the controller is an array controller or a disk controller.

14. A method of performing a write command of data to a disk drive, comprising:
   invoking a write command of data to a storage device including parameters specifying the data and information about contents of the data, wherein the data to be written is sent in a first stream and the information about contents of the data is sent in a second stream, separate from the first stream;
   verifying the contents of the data utilizing the information; and
   committing the write command of the data to the storage device if the contents of the data are verified.

15. The method of claim 14, wherein the second stream is sent before the first stream.

16. The method of claim 14, wherein the information is that the data XORs to a specified value.

17. The method of claim 14, wherein the information specifies a number contained in the data.

18. The method of claim 17, wherein the number is a block number.

19. The method of claim 18, wherein the information further specifies a length of a block.

20. The method of claim 17, wherein the information further specifies an offset of the number in the data.

21. The method of claim 14, wherein the data includes a plurality of blocks and the information specifies a block number, an offset of the block number in a block and a length of a block.

22. The method of claim 21, wherein verifying comprises:
   verifying a first block has the block number at the offset in the first block; and
   verifying each subsequent block has a sequentially higher block number at the offset in the subsequent block, wherein each subsequent block is located utilizing the length of a block.

23. The method of claim 14, wherein the storage device is a disk drive.

24. A computer program product that performs a write command of data to a storage device, comprising:
   computer code that issues a write command of data to a storage device drive including parameters specifying the data and information about contents of the data, wherein the data to be written is sent in a first stream and the information about contents of the data is sent in a second stream, separate from the first stream;
   computer code that verifies the contents of the data utilizing the information; and
   computer code that commits the write command of the data to the storage device if the contents of the data are verified; and
   a computer readable storage medium that stores the computer codes.

25. The computer program product of claim 24, wherein the computer readable medium is a CD-ROM, floppy disk, tape, flash memory, system memory, or hard drive.

26. A system, comprising:
   an application that issues a write command of data to a storage device including parameters specifying the data and information about contents of the data, wherein the application specifies data is to be sent in a first stream and information about contents of the data is to be sent in a second stream, separate from the first stream;
   a controller that receives the write command and verifies the contents of the data utilizing the information; and
   a storage device that commits the write command if the contents of the data are verified.

27. The system of claim 26, wherein the controller is an array controller or a disk drive controller.

28. The method of claim 1, wherein the information about the contents of the data is transmitted separately from the data.

29. The method of claim 1, wherein invoking the write command includes:
   receiving a command specifying the information about the contents of the data, wherein the command does not specify the data.

30. A computer-implemented method of performing a write command, comprising:
   invoking a write command specifying data to be written and information about contents of the data, wherein the data to be written is sent in a first stream and the information about contents of the data is sent in a second stream, separate from the first stream;
   verifying the contents of the data utilizing the information;
   writing the data if the contents of the daata are verified; and
   generating an error indication if the contents of the data are not verified.

* * * * *